(12) United States Patent
Fuetterer (10) Patent No.: US 11,936,189 B2
(45) Date of Patent: Mar. 19, 2024

(54) COMBINED CYCLE FREQUENCY CONTROL SYSTEM AND METHOD

(71) Applicant: SIEMENS ENERGY, INC., Orlando, FL (US)

(72) Inventor: Bernd M. Fuetterer, Clarkesville, GA (US)

(73) Assignee: Siemens Energy, Inc., Orlando, FL (US)

(*) Notice: Subject to any disclaimer, the term of this patent is extended or adjusted under 35 U.S.C. 154(b) by 241 days.

(21) Appl. No.: 17/631,687

(22) PCT Filed: Jul. 14, 2020

(86) PCT No.: PCT/US2020/041915
§ 371 (c)(1),
(2) Date: Jan. 31, 2022

(87) PCT Pub. No.: WO2021/025829
PCT Pub. Date: Feb. 11, 2021

(65) Prior Publication Data
US 2022/0278532 A1    Sep. 1, 2022

Related U.S. Application Data

(60) Provisional application No. 62/883,151, filed on Aug. 6, 2019.

(51) Int. Cl.
*F01K 23/10* (2006.01)
*F02C 6/18* (2006.01)
(Continued)

(52) U.S. Cl.
CPC .............. *H02J 3/40* (2013.01); *F01K 23/101* (2013.01); *F02C 6/18* (2013.01); *H02J 3/24* (2013.01);
(Continued)

(58) Field of Classification Search
CPC ...... F01K 17/025; F01K 21/047; F01K 23/10; F01K 23/101; F01K 23/16; F02C 6/18;
(Continued)

(56) References Cited

U.S. PATENT DOCUMENTS

| 5,555,719 A | 9/1996 | Rowen et al. |
| 2009/0212563 A1 | 8/2009 | Morjaria |

(Continued)

FOREIGN PATENT DOCUMENTS

| CN | 101515722 A | 8/2009 |
| CN | 102996252 A | 3/2013 |

(Continued)

OTHER PUBLICATIONS

PCT International Search Report and Written Opinion dated Nov. 10, 2020 corresponding to PCT Application No. PCT/US2020/041915 filed Jul. 14, 2020.

(Continued)

*Primary Examiner* — Levi Gannon
(74) *Attorney, Agent, or Firm* — Thomas J. Otterlee (57) ABSTRACT

A power plant is operable to provide primary frequency control for a grid. The power plant includes a gas turbine operable to power a first generator that is synchronized to the power grid and to produce an exhaust gas, the gas turbine operated at a power level that defines a non-zero first MW margin and including a first control system having a first droop setting, and a heat recovery steam generator (HRSG) operable to generate high pressure steam in response to the passage of the exhaust gas through the HRSG. A steam turbine is operable to power a second generator that is synchronized to the power grid, the steam turbine is operated at a power level that defines a non-zero second MW margin and includes a second control system having a second droop setting, the second droop setting set to a value based at least (Continued)

in part on the second MW margin. The first control system calculates the first droop setting based at least in part on the first MW margin, the second droop setting, the second MW margin, and a regional required total droop for the combination of the gas turbine and the steam turbine.

17 Claims, 4 Drawing Sheets (51) Int. Cl.
*H02J 3/24* (2006.01)
*H02J 3/40* (2006.01)
(52) U.S. Cl.
CPC ...... *F05D 2220/72* (2013.01); *F05D 2220/76* (2013.01); *Y02E 20/16* (2013.01)
(58) Field of Classification Search
CPC ............. F05D 2220/72; F05D 2220/74; F05D 2220/76; H02J 3/24; H02J 3/40; Y02E 20/16
See application file for complete search history.

(56) References Cited

U.S. PATENT DOCUMENTS

| | | |
|---|---|---|
| 2009/0277183 A1 | 11/2009 | Guzman et al. |
| 2011/0301769 A1 | 12/2011 | Lovmand et al. |
| 2013/0145772 A1 | 6/2013 | Schlesier et al. |
| 2014/0060065 A1 | 3/2014 | Sweet et al. |
| 2014/0111167 A1 | 4/2014 | Hyypio et al. |
| 2014/0260293 A1 | 9/2014 | Chen et al. |
| 2014/0265354 A1 | 9/2014 | Folken et al. |
| 2015/0159626 A1 | 6/2015 | Tarnowski |
| 2015/0176437 A1 | 6/2015 | Tobo et al. |
| 2015/0370277 A1 | 12/2015 | Britt |
| 2020/0295574 A1* | 9/2020 | Batsch-Smith ...... G05B 19/042 |

FOREIGN PATENT DOCUMENTS

| | | |
|---|---|---|
| CN | 103109085 A | 5/2013 |
| CN | 103792852 A | 5/2014 |
| CN | 104052353 A | 9/2014 |
| CN | 104271942 A | 1/2015 |
| CN | 105162167 A | 12/2015 |
| CN | 106030051 A | 10/2016 |
| CN | 106575102 A | 4/2017 |
| CN | 108462196 A | 8/2018 |
| CN | 109995051 A | 7/2019 |
| EP | 1233149 A2 | 8/2002 |
| WO | 2012039063 A1 | 3/2012 |

OTHER PUBLICATIONS

Hu Jian, Ma Hao / Multi-Agent System Based Optimal Power Dispatch Algorithm for Microgrid, ( ), Power System Technology, vol. 41 No. 8. / May 8, 2017.

Luo Binglin, Luo Pingping / How to Configurate the Co circulation Generation Units, Oct. 1999.

* cited by examiner

COMBINED CYCLE FREQUENCY CONTROL SYSTEM AND METHOD

TECHNICAL FIELD

The present disclosure is directed, in general, to a control system for a power generation unit, and more specifically to a control system for a combined cycle power generation unit.

BACKGROUND

In an electrical grid system, power generation units are often required to participate in frequency control for the grid. Often, this requires the power generation units to operate at some level below full capacity to assure that some megawatt (MW) margin is available for frequency control.

SUMMARY

A method of controlling frequency in a power grid including operating a gas turbine to power a first generator that is synchronized to the power grid, the gas turbine including a first control system having a first droop setting, and directing an exhaust from the gas turbine through a heat recovery steam generator (HRSG) to generate high pressure steam. The method also includes directing the high-pressure steam through a steam turbine to power a second generator that is synchronized to the power grid, the steam turbine including a second control system having a second droop setting, setting the second droop setting to a value based at least in part on an available MW margin of the steam turbine, and calculating the first droop setting based at least in part on the MW margin of the gas turbine, the second droop setting, and a regional required total droop for the combination of the gas turbine and the steam turbine.

In another construction, a power plant is operable to provide primary frequency control for a grid. The power plant includes a gas turbine operable to power a first generator that is synchronized to the power grid and to produce an exhaust gas, the gas turbine operated at a power level that defines a non-zero first MW margin and including a first control system having a first droop setting, and a heat recovery steam generator (HRSG) operable to generate high pressure steam in response to the passage of the exhaust gas through the HRSG. A steam turbine is operable to power a second generator that is synchronized to the power grid, the steam turbine is operated at a power level that defines a non-zero second MW margin and includes a second control system having a second droop setting, the second droop setting set to a value based at least in part on the second MW margin. The first control system calculates the first droop setting based at least in part on the first MW margin, the second droop setting, the second MW margin, and a regional required total droop for the combination of the gas turbine and the steam turbine.

In another construction, a method of controlling a power plant to regulate grid frequency is used in a power plant that includes a gas turbine and a steam turbine. The method includes assigning a frequency regulation requirement to the power plant, the frequency regulation requirement including a total load the plant is required to output to correct for frequency drops in the grid frequency, and operating a plant controller including a first controller that controls the operation of the gas turbine and a second controller that controls the operation of the steam turbine. The method also includes setting a steam turbine droop setting using the second controller, the steam turbine droop setting based at least in part on a MW capacity of the steam turbine and a HRSG storage value, setting a gas turbine droop setting using the first controller, the gas turbine droop setting based at least in part on the steam turbine droop setting and the frequency regulation requirement, and resetting the steam turbine droop setting and the gas turbine droop setting at least once every ten second.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Droop is a term of art used in prime mover control. Droop or speed droop is a governor function which reduces the governor reference speed as fuel position (load) changes. Fuel position can be the valve position in a steam turbine or a fuel flow rate in a gas turbine for example. Droop is typically a straight-line function, with a certain speed reference for every fuel position. Normally, a droop governor lowers the speed reference from 3 to 5 percent of the reference speed over the full range of the governor output. Thus a 3% droop governor with a reference speed of 3708 rpm at no load would have a reference speed of 3600 rpm at full load (and full fuel flow) (61.8 Hz at no load and 60 Hz at full load).

Figure 1:
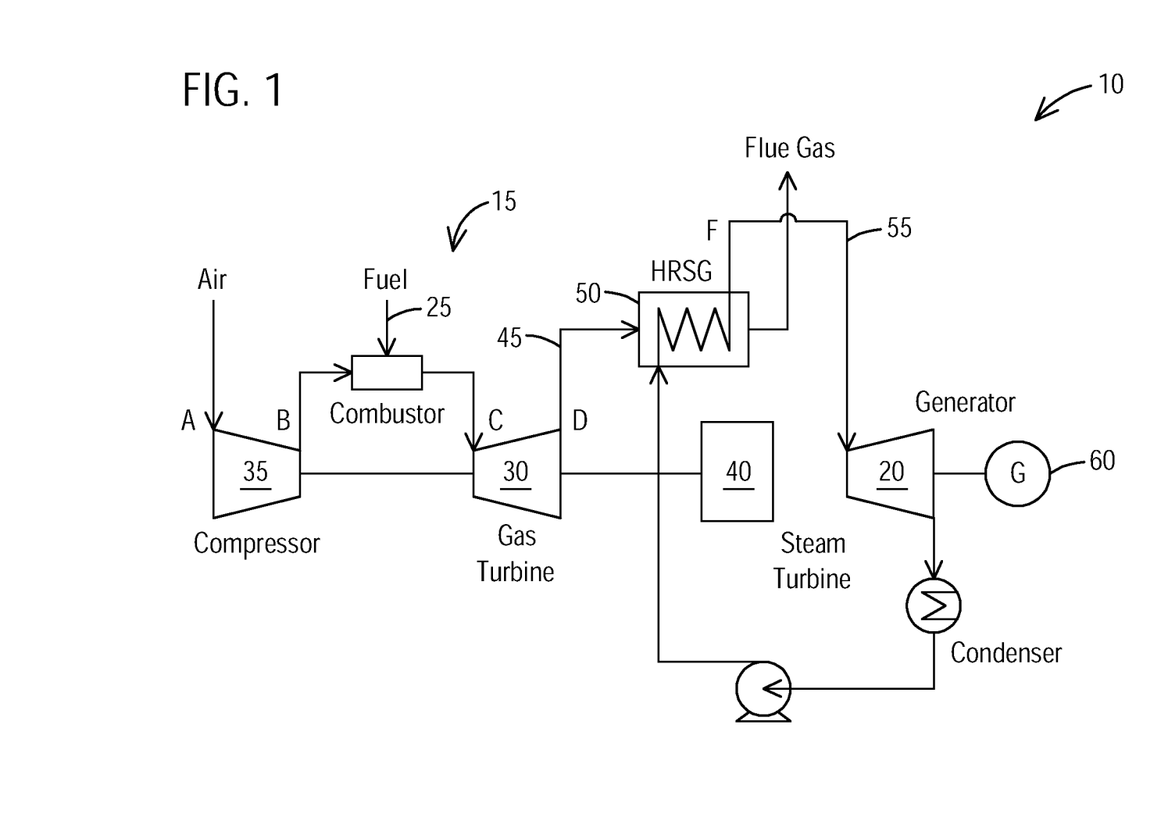
FIG. 1 is a schematic illustration of a combined cycle power plant.

FIG. 1 illustrates a basic or well-known combined cycle power plant 10 that includes one or more gas turbines 15 or combustion turbine engines and a steam turbine 20. The gas turbine 15 combusts a fuel 25 to produce high-temperature, high-pressure combustion gas that passes through a turbine 30 to drive a compressor section 35 of the gas turbine 15 and drives a first generator 40. An exhaust gas 45 exits the turbine 30 and is still quite hot and is therefore directed to a heat exchanger often referred to as a heat recovery steam generator (HRSG 50). The HRSG 50 produces high-pressure high temperature steam 55 that is directed to the steam turbine 20 to produce rotational energy that drives a second generator 60. The gas turbine engine 15 includes one or more valves or other control devices that control the fuel and air flow to control the power output of the first generator 40 as well as the properties of the exhaust gas 45. Similarly, the steam turbine 20 includes valves or other control members that control the steam flow to the steam turbine 20 and therefore the output power from the steam turbine 20 and the second generator 60.

The first generator 40 and the second generator 60 are preferably synchronous generators that rotate to produce alternating current (AC) electricity at a frequency that is proportional to their respective rotating speeds. For example, a two-pole synchronous generator operating at 3600 RPM would generate electricity at a frequency of 60 Hz.

During the operation of a turbine 15, 20 powering a generator 40, 60, the speed of the turbine 15, 20 will tend to drop as load on the generator 40, 60 is increased. However, in a synchronized grid system, the overall inertia of the system will tend to maintain the speed of each generator 40, 60 at a speed that produces the desired frequency and will make variations in speed slow as the inertia of the entire system must be overcome. If however, during operation a large load is added to the grid, the generators 40, 60 will slow slightly. Each turbine 15, 20 connected to the grid will sense the speed error (compared to its reference speed) via its control system or governor and will attempt to correct the error. As the controls call for more fuel or move the valves to increase the steam flow, the droop function will change the speed reference (lower in this example) to assure that the changes are stable. As the power provided to the grid by all the units increases, the speed will return to normal and the load will be provided for. If a turbine connected to the grid does not include droop, it will also attempt to increase the flow of fuel (or steam) to correct the speed error. However, without the droop correction, the delay in speed change caused by the inertia of the entire system will cause the fuel flow or steam flow to continue to increase to a maximum value. Thus, the turbine without droop will attempt to compensate for the entire load change and will likely operate in an unstable manner (swinging from maximum fuel (steam) flow to minimum in an effort to control the speed of the entire grid). Thus, droop allows multiple grid-connected units to share load changes in a stable manner with each unit picking up (or dropping) load in an amount proportional to its overall rating and its droop setting.

Preferably, each of the gas turbine 15 and the steam turbine 20 of the combined cycle power plant 10 participate in primary frequency control. Primary frequency control requires that each of the gas turbine 15 and the steam turbine 20 be capable of increasing or decreasing load in response to changes in the grid frequency.

The gas turbine 15 and steam turbine 20 should fulfill certain criteria for the frequency control and these criteria are typically set by the region in which the power plant is operating. These criteria could include the specific droop setting for each turbine 15, 20 and the time within which the turbines 15, 20 should react to a particular load change. Typically, the plant, system, or unit is assigned a total droop (plant total droop) or an amount of load required for frequency regulation for the entire plant, system, or unit. The plant, system, or unit may include a steam turbine and one or more combustion turbines. The plant control system can divide the total droop and frequency regulation requirements among the different turbines based on virtually any criteria so long as the overall requirements for frequency regulation are met.

To participate in primary frequency control, the load of the gas turbine 15 should be reduced to a level below full load or 100 percent to assure that a reserve or MW margin is available for primary frequency control. For example, when the frequency drops on the grid (sudden load increase), the gas turbine 15 needs to increase its output within a certain time and with a defined output amount determined by the droop setting. This is only possible when the output of the gas turbine 15 is below its maximum output before the frequency drop.

For the steam turbine 20, the control valve needs to be throttled (closed slightly) to provide the MW margin needed for primary frequency control. However, there is a limitation on the throttling as it produces higher pressure in the HRSG 50 or boiler. Therefore, the droop factor is preferably higher than the droop setting for the gas turbine 15 which means the steam turbine 20 provides less frequency control than the gas turbine 15. In some situations, the reduced frequency control of the steam turbine 20 can result in the total plant 10 not fulfilling the requirements for primary frequency control.

Some regions will allow the gas turbine 15 to compensate for the missing MWs. A control system 65, illustrated in FIGS. 2 and 3 delivers a fully automated solution, which calculates the additional needed MWs for the gas turbine 15 as well as the optimal reserve (MW margin) needed for each turbine 15, 20 to meet the requirements for primary frequency control.

Figure 2:
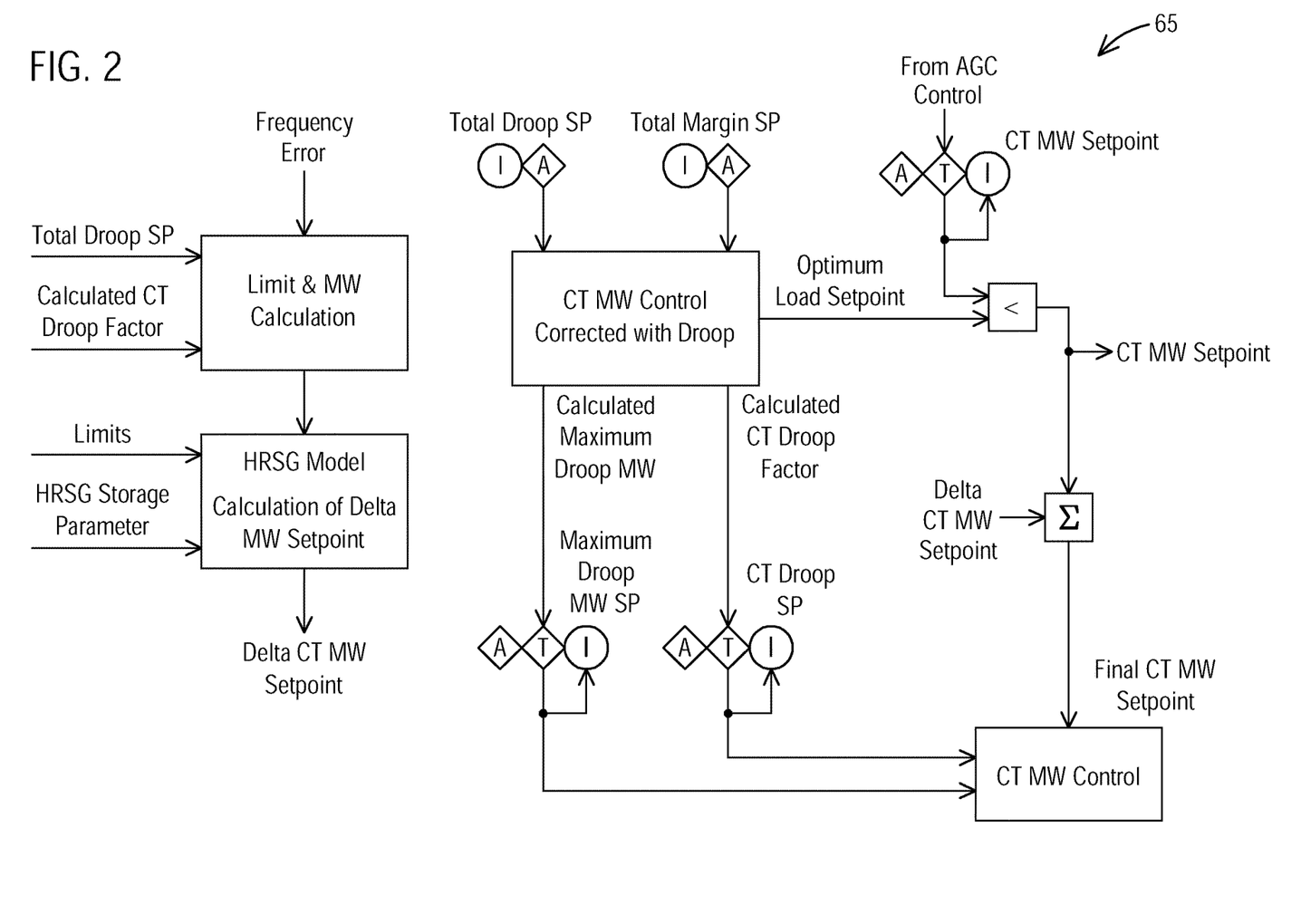
FIG. 2 is a control schematic of a portion of the plant control system adapted to control the gas turbine.
Figure 3:
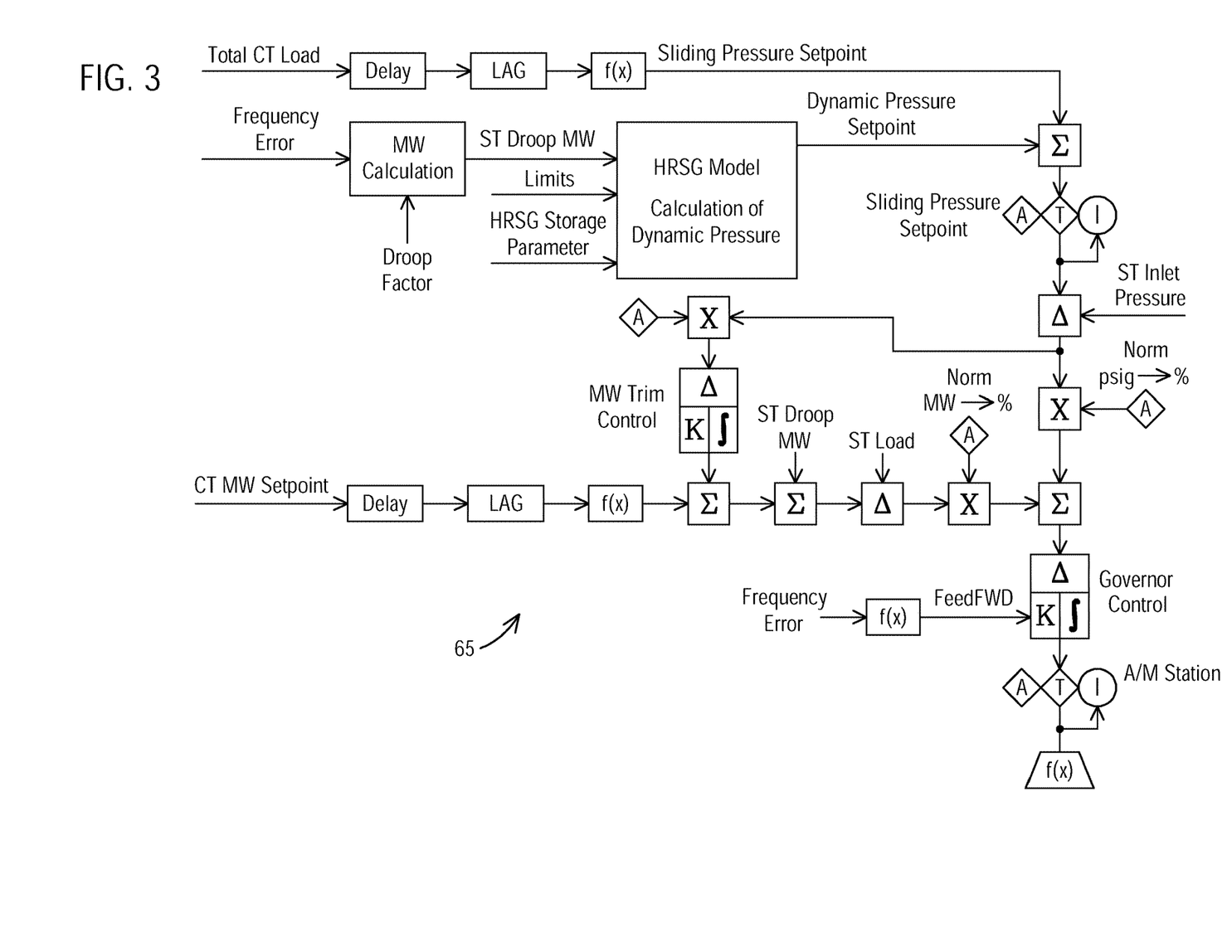
FIG. 3 is a control schematic of a portion of the plant control system adapted to control the steam turbine.

If the steam turbine 20 cannot fulfill the frequency control requirements, the specification of the primary frequency regulation may allow for the gas turbine 15 to compensate for the load the steam turbine 20 cannot provide. Therefore, the operator can adjust the droop factor for the gas turbine 15 lower (higher frequency control participation) and reduce the load on the gas turbine 15 more, to provide a higher MW margin for the gas turbine 15 and allowing for higher load changes on a frequency drop. During operation, process conditions may require that these settings change continuously. It is not possible for an operator to manually recalculate and make these changes during operation.

The control system 65 for the primary frequency control calculates automatically the optimum droop setting as well as the optimum reserve (MW margin) needed to fulfill the regional requirements. The calculation of the MW margin automatically reduces the load to an optimum load, so there is exactly the MW Margin available to react to a frequency drop (load increase).

The total maximum droop will be distributed among the gas turbine 15 and the steam turbine 20 depending on their availability. The MW margin will then be calculated for each gas turbine 15. That means the derating of each gas turbine 15 is automatically calculated and indicated for the operator. If the steam turbine 20 is not available, the derating is higher. When the steam turbine 20 is available the derating is less.

The optimum droop is calculated for each turbine 15, 20 to achieve the required total droop for the whole plant 10. For example, in a grid system in which the average droop is 4%, any generating unit operating with a 4% droop will compensate for load changes equally as a percentage of its rating (e.g., a 200 MW generator will pick up or drop twice the load of a 100 MW generator in response to a load change). However, if the droop setting for the steam turbine 20 is a higher percent (e.g., 5 percent), it will compensate for a smaller proportionate amount of the load change. Therefore, for the overall plant 10 to compensate for a given load change in an amount proportionate to the plant's total output, the gas turbine 15 must have a lower droop than the average of the grid (e.g. 3%) to make up for the lower level of compensation provided by the high droop steam turbine 20. The actual droop setting for the gas turbine 15 would be a function of the load rating for the steam turbine 20 and the gas turbine 15 as well as the droop setting of the steam turbine 20 and the required compensation set by the region. The present system 65 calculates that droop value and optimizes that value in real-time during operation of the plant 10.

In addition, in plants 10 that include two or more gas turbines 15 for each steam turbine 20, the plant 10 will account for varying availability of the gas turbines 15. For example, when one gas turbine 15 is not available or is less available for frequency control (e.g., MW limited) the remaining gas turbine 15 or turbines 15 can be given droop settings to compensate. Alternatively, in situations when the steam turbine 20 is not available or limited for primary frequency control (MW limited), the gas turbine 15 or turbines can compensate for the missing frequency control by receiving lower droop settings to achieve the total frequency control required for the plant 10 by the region.

The system 65 does provide an absolute maximum MW margin for each gas turbine 15 to avoid over participation by the gas turbine 15 or turbines 15. This limit is based on the control capability of each gas turbine 15 and determines how large of a step change (MW) the boiler or HRSG 50 and the gas turbine 15 or turbines 15 can handle while not upsetting the operation of the boiler, HRSG 50, or gas turbine 15 or creating extreme temperatures or pressures in the system 65 that might damage the boiler, HRSG 50, or gas turbine 15.

The system 65 also uses a HRSG storage value to react to frequency drops with the steam turbine 20. The HRSG storage value is indicative of the reaction time of the HRSG and the steam turbine and takes into account the volume of the HRSG, the volume and size of any pipes into and out of the HRSG, valves, and any other components or properties that may affect the response time of the steam turbine and the HRSG. In general, the steam turbine 20 operates in a sliding pressure operation mode with the steam turbine control or governor valves wide open in order to avoid efficiency loss caused by throttling the steam with the turbine control valves. During sliding pressure operation, the main steam pressure is varied to control the load of the steam turbine rather than throttling the steam through the governor or control valves. By not throttling the main steam, the steam turbine can be run more efficiently but it is more difficult to quickly add load as it takes time for the HRSG to increase pressure. In sliding pressure mode, the steam turbine 20 does not have any reserve to rapidly support frequency drops as additional pressure must first be created in the HRSG 50 which requires more time than is normally allotted for making frequency corrections in a grid-connected system.

Any load variation of the gas turbine 15 produces a delayed 'natural' reaction of steam turbine output due to the time-delayed behavior of steam generation in the HRSG 50. Because of this relationship, when operating in sliding pressure mode, the steam turbine 20 has no reserve to support frequency excursions. To address this, the system 65 of FIGS. 2 and 3 operates the steam turbine governor (control) valves in the throttling range to provide primary frequency control in both directions even when sliding pressure. Thus, the system 65 uses the additional energy stored in the HRSG 50 to provide the steam turbine response and the gas turbine 15 or turbines 15 are used to balance out the steam/energy storage in the HRSG 50.

To achieve this, the pressure setpoints for the HRSG 50 and the steam turbine 20 are calculated with a dynamic model which includes the HRSG storage time and delay time. After a load increase, re-filling the HRSG's steam systems and increasing the HRSG pressure to its previous pressure level is required so that the steam turbine 20 is ready for an additional frequency response requirement.

The system 65 automatically calculates the optimum droop setting as well as the optimum maximum MW margin such that no manual action is required. Also, through the optimum calculations, the load is always on an optimum point and the derating of the units 15, 20 for primary frequency control is reduced or optimized.

FIG. 2 describes the control of the gas turbine 15. The Delta CT MW setpoint is calculated from the frequency error (Droop calculation). This is the additional MW needed for the gas turbine 15 due to a frequency error. It is using the HRSG (Heat Recovery Steam Generator) energy storage model to compensate for the delayed steam generation response that will affect the operation of the steam turbine 20.

FIG. 2 also illustrates all the calculations required to determine the optimum droop (maximum droop) to achieve the required total droop for the plant 10, as well as the optimum load setpoint calculation for the gas turbine 15.

More specifically, FIG. 2 illustrates a limit and megawatt (MW) calculation that takes as input a frequency error from the grid a total droop set point for the plant, system or unit, and a calculated combustion turbine droop factor. The limit and MW calculation determines MW limits for each turbine and uses that data as well as any limits specific to one or more of the turbines (e.g., load limits, droop set points, etc.), and the HRSG storage parameter to calculate delta MW set points and to output delta combustion turbine MW setpoints.

With continued reference to FIG. 2, the plant control system uses the total droop set point and a total margin setpoint in a combustion turbine megawatt control corrected with droop to calculate optimum load setpoints, maximum droop MWs and calculated combustion turbine droop factors that are then used by one or more combustion turbine MW controllers to control the individual turbines.

FIG. 3 describes the control of the steam turbine 20. Since the steam turbine 20 is in sliding pressure mode to control the steam turbine inlet pressure, the control needs to be corrected with a dynamic pressure setpoint, to make sure that the steam turbine control doesn't cancel out the frequency event. The steam turbine governor valves are therefore operated in the throttling range to provide primary frequency control in both directions. The dynamic pressure setpoint is a model-based concept which varies with the energy storage capacity of the HRSG 50 as well as the time delay required to generate steam in the HRSG 50 to restore pressure after a sudden load increase (in response to a frequency drop). Additionally, a MW-Trim controller corrects the steam turbine load setpoint in case of major pressure excursions.

In most applications, the droop for the steam turbine is based on process parameters and is continuously or periodically (at least once per minute) adjusted. For example, changes in the main steam pressure, main steam temperature, and/or the control/governor valve positions may all be used to adjust the droop value for the steam turbine. The droop setting for the remaining combustion turbine or turbines is then set for each combustion turbine based on a total droop or frequency regulation requirement for the plant or system of turbines and the droop setting for the steam turbine.

Figure 4:
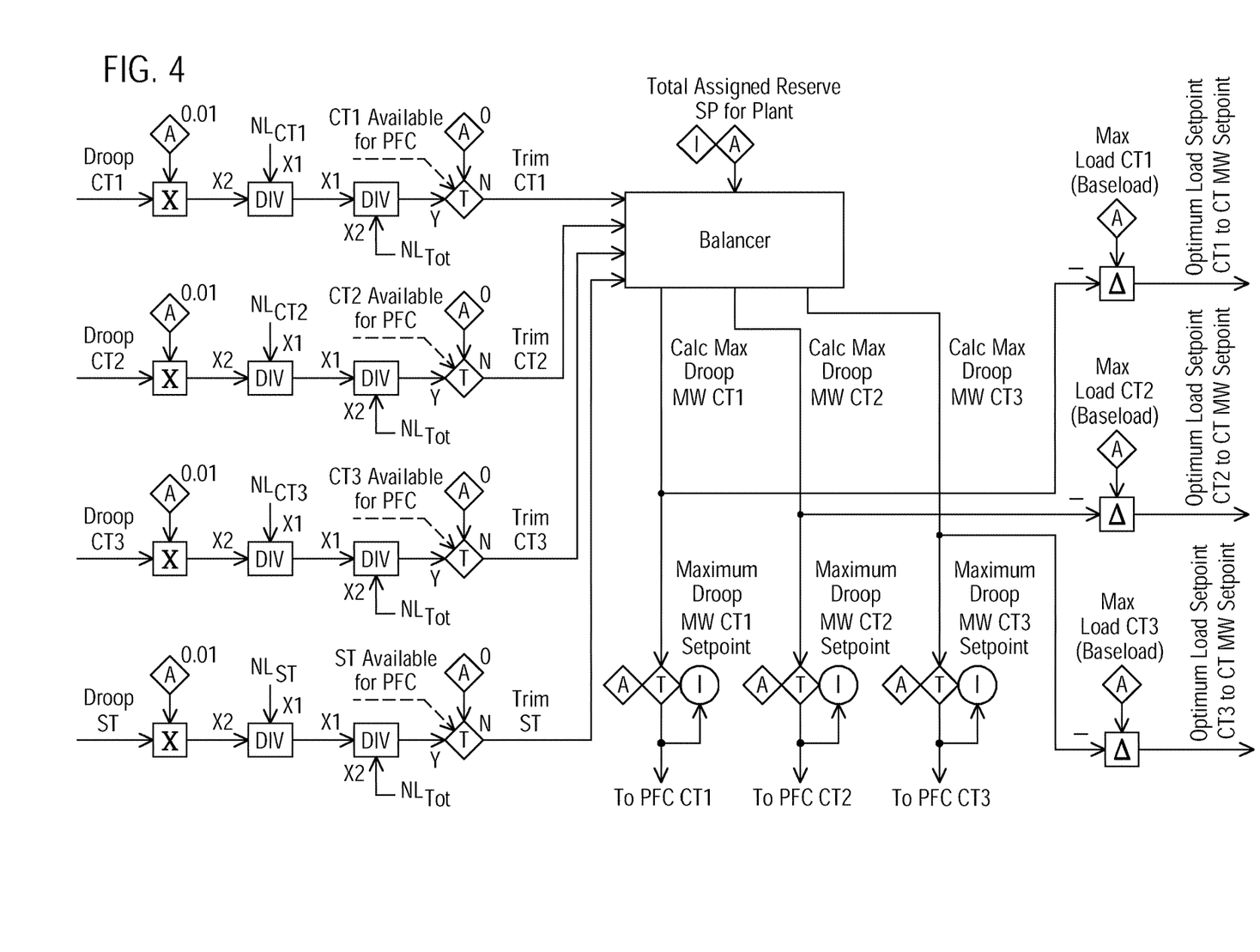
FIG. 4 is a more detailed control schematic illustrating the droop and load set point calculations.

FIG. 4 is a more detailed illustration of a portion of the system logic employed to calculate the maximum droop (margin) and the optimum load in a system that includes a single steam turbine and three combustion turbines.

As noted above, the droop setting for the steam turbine is typically established based on process parameters such as but not limited to the HRSG storage parameter, the main steam pressure and temperature, and the total load of the steam turbine. Thus, while the droop setting for the steam turbine is a calculated value, it is calculated based on plant-specific parameters and not necessarily influenced by outside factors. This arrangement leaves the combustion turbines to pick up any additional frequency regulation requirements assigned to the plant, system or unit.

FIG. 4 better illustrates the process employed for calculating the droop for each combustion turbine. Specifically, the droop set point and the nominal load for each turbine are multiplied or divided to determine the total MWs available for frequency regulation. These values (either values or a percentage of the total Mw regulation available) are fed to a balancer that periodically recalculates and rebalances the droop values and load setpoint values based on the current operating conditions. These new values are then output to the various turbines and the process is repeated.

The following are examples of a system as described herein applied to a plant that includes a single steam turbine with a rating of 280 MW and three gas turbines each with a rating of 180 MW such that the total plant rating is 820 MW.

In the first example, all the turbines are available for primary frequency control and the steam turbine droop is based on process conditions. At an initial operating point, the steam turbine droop is set at 6% and the droop for the total plant is 5%. The following equation is used to calculate the droop for each of the combustion turbines.

$$\text{Droop}_{CT1} = NL_{TotalCT}/(NL_{Total}/(\text{Droop}_{Total\ SP}*0.01) - NL_{ST}/(\text{Droop}_{ST}*0.01))*100$$

Using this equation, the droop for each of the combustion turbines is set to 4.6%.

In another operating scenario, the steam turbine is not available for frequency control. This may happen when the steam turbine is offline, the steam turbine is under manual control or is otherwise load limited. If the plant total droop is 5% the equation $\text{Droop}_{CT1} = NL_{TotalCT}/(NL_{Total}/\text{Droop}_{Total\ SP}*0.01))*100$ results in a droop setting for each of the combustion turbines of 3.3%.

In a more complicated scenario, all three combustion turbines and the steam turbine are in primary frequency control and one of the combustion turbines is operated in a local mode, meaning, the droop setpoint is not calculated, but rather is set by the operator. The following formula applies for this case:

$$\text{Droop}_{CT1} = NL_{TotalCT}/(NL_{Total}/(\text{Droop}_{Total\ SP}*0.01) - NL_{ST}/(\text{Droop}_{ST}*0.01) - NL_{CT3}/(\text{Droop}_{CT3}*0.01))*100$$

In this example, the total plant droop is 5%, the steam turbine droop set point is 5.5% based on process conditions, and the combustion turbine operating in local mode is set at a droop set point of 5%. Using the above equation, the droop setpoint for the two remaining combustion turbines is 4.66%.

As discussed, the process conditions change continuously such that the calculations for the various droop settings are repeated periodically (at least once per minute) or continuously. This assures that the droop settings for the various combustion turbines is set to deliver the necessary frequency regulation without over-limiting the total output of the various turbines.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of controlling frequency in a power grid, the method comprising:
    operating a gas turbine to power a first generator that is synchronized to the power grid, the gas turbine including a first control system having a first droop setting;
    directing an exhaust from the gas turbine through a heat recovery steam generator (HRSG) to generate high pressure steam;
    directing the high-pressure steam through a steam turbine to power a second generator that is synchronized to the power grid, the steam turbine including a second control system having a second droop setting;
    setting the second droop setting to a value based at least in part on an available MW margin of the steam turbine; and
    periodically calculating the first droop setting based at least in part on the MW margin of the gas turbine, the second droop setting, and a plant required total droop for the combination of the gas turbine and the steam turbine.

2. The method of claim 1, further comprising calculating a HRSG storage value for the HRSG, the HRSG storage value being proportional to a HRSG time delay.

3. The method of claim 2, wherein the setting the second droop setting to a value is based at least in part on the HRSG storage value.

4. The method of claim 1, wherein the periodically calculating step is performed at least once per second.

5. The method of claim 1, wherein the first droop setting is based at least in part on the plant required total droop, the second droop setting, the available MW margin of the steam turbine, and a total MW rating of the gas turbine.

6. The method of claim 1, further comprising operating a plant controller to coordinate the operation of the first controller and the second controller.

7. A power plant operable to provide primary frequency control for a grid, the power plant comprising:
    a gas turbine operable to power a first generator that is synchronized to the power grid and to produce an exhaust gas, the gas turbine operated at a power level that defines a non-zero first MW margin and including a first control system having a first droop setting;
    a heat recovery steam generator (HRSG) operable to generate high pressure steam in response to the passage of the exhaust gas through the HRSG;
    a steam turbine operable to power a second generator that is synchronized to the power grid, the steam turbine operated at a power level that defines a non-zero second MW margin and including a second control system having a second droop setting, the second droop setting set to a value based at least in part on the second MW margin, wherein the first control system calculates the first droop setting based at least in part on the first MW margin, the second droop setting, the second MW margin, and a regional required total droop for the combination of the gas turbine and the steam turbine.

8. The power plant of claim 7, wherein the HRSG defines a HRSG storage value, the HRSG storage value being proportional to a HRSG time delay.

9. The power plant of claim 8, wherein the second droop setting is based at least in part on the HRSG storage value.

10. The power plant of claim 7, wherein the second control system sets the second droop at least once per second.

11. The power plant of claim 7, wherein the first droop setting is based at least in part on the plant required total droop, the second droop setting, the available MW margin of the steam turbine, and a total MW rating of the gas turbine.

12. The method of claim 7, further comprising a plant controller operable to coordinate the operation of the first controller and the second controller.

13. A method of controlling a power plant to regulate grid frequency, the power plant including a gas turbine and a steam turbine, the method comprising:
    assigning a frequency regulation requirement to the power plant, the frequency regulation requirement including a total load the plant is required to output to correct for frequency drops in the grid frequency;
    operating a plant controller including a first controller that controls the operation of the gas turbine and a second controller that controls the operation of the steam turbine;
    setting a steam turbine droop setting using the second controller, the steam turbine droop setting based at least in part on a MW capacity of the steam turbine and a HRSG storage value;
    setting a gas turbine droop setting using the first controller, the gas turbine droop setting based at least in part on the steam turbine droop setting and the frequency regulation requirement; and
    resetting the steam turbine droop setting and the gas turbine droop setting at least once every ten second.

14. The method of claim 13, further comprising calculating the HRSG storage value for the HRSG based at least in part on the volume of the HRSG, the temperature of a fluid within the HRSG, and a pressure of the fluid within the HRSG, the HRSG storage value being proportional to a HRSG time delay.

15. The method of claim 13, wherein the steam turbine droop setting and the gas turbine droop setting are reset at least once per second.

16. The method of claim 13, wherein the gas turbine droop setting is based at least in part on an available MW margin of the steam turbine, and a total MW rating of the gas turbine.

17. The method of claim 13, wherein the first controller and the second controller are separate from the plant controller.

* * * * *